(12) United States Patent
Bischof et al.

(10) Patent No.: US 6,365,047 B1
(45) Date of Patent: Apr. 2, 2002

(54) METHOD AND DEVICE FOR TREATING BIOGENIC RESIDUES

(75) Inventors: Franz Bischof, Sulzbach-Rosenberg; Ralf Schneider, Nuremberg; Rolf Jung, Gunzenhausen; Bernd Genenger, Hetzles, all of (DE)

(73) Assignee: Applikations-und Technikzentrum für Energieverfahrens-Umwelt-, und Strömungstechnik (ATZ-EVUS) (DE)

( * ) Notice: Subject to any disclaimer, the term of this patent is extended or adjusted under 35 U.S.C. 154(b) by 0 days.

(21) Appl. No.: 09/445,236
(22) PCT Filed: May 30, 1998
(86) PCT No.: PCT/DE98/01507
  § 371 Date: Jan. 24, 2000
  § 102(e) Date: Jan. 24, 2000
(87) PCT Pub. No.: WO98/55408
  PCT Pub. Date: Dec. 10, 1998

(30) Foreign Application Priority Data
  Jun. 5, 1997 (DE) .......... 197 23 510
(51) Int. Cl.⁷ .................. C02F 3/00
(52) U.S. Cl. .......... 210/603; 210/629; 210/739; 210/109; 210/173; 210/801; 210/805
(58) Field of Search .......... 210/801, 805, 210/629, 739, 109, 173, 603

(56) References Cited

U.S. PATENT DOCUMENTS 2,967,618 A  * 1/1961 Vane
3,362,542 A  * 1/1968 Stevens
5,695,648 A  * 12/1997 Fassbender
5,770,081 A  * 6/1998 McKinney

FOREIGN PATENT DOCUMENTS

EP  0007489 A1 * 2/1980

* cited by examiner

Primary Examiner—Chester T. Barry
(74) Attorney, Agent, or Firm—Vanophem & Vanophem, P.C.

(57) ABSTRACT

The invention relates to a method for treating biogenic residues, especially cafeteria leftovers, meat refuse, clarification sludge, organic industrial wastes and the like, wherein the residues are subjected to temperature pressure hydrolysis. In order to obtain a higher flow rate for residues using a small apparatus, the invention provides that temperature pressure hydrolysis is carried out in a cylindrical section in a first direction and in an external radial section in a second direction, the second direction being opposite to the first direction.

18 Claims, 1 Drawing Sheet

METHOD AND DEVICE FOR TREATING BIOGENIC RESIDUES

CROSS-REFERENCES TO RELATED APPLICATIONS

Not applicable.

FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The invention relates to a process and apparatus for treating biogenic residues, including canteen wastes, meat wastes, sewage sludges, and organic industrial wastes.

2. Description of the Related Art

A process and apparatus of the above type are disclosed by DE 44 03 391 A1. According to this reference temperature-pressure hydrolysis (TPH) is carried out in a tubular reactor. To achieve significant throughput, considerable dimensions are required for a reactor of this type. At a feed rate of, for example, 1.7 metric t of biogenic residue/hour, a reactor of this type would have to have a tube length of several thousand meters.

DE 43 33 468 A1 discloses carrying out a temperature-activated liquid phase hydrolysis in a heatable tubular or cascade stirred reactor to treat biogenic residues. The sealing of the stirrer shafts of reactors of this type is a problem during operation, which customarily takes place at high pressure.

BRIEF SUMMARY OF THE INVENTION

It is an object of the present invention to provide a process and an apparatus that eliminates the disadvantages of the prior art. In particular, according to the present invention, simplification of the reactor and increased throughput are to be achieved.

According to the process-side solution of the invention, the temperature-pressure hydrolysis is carried out in a cylindrical reactor in which the residue to be treated flows axially in a first direction in a radially inner cylinder section and flows axially in a second direction in a radially outer section, the second direction being in the opposite direction to the first direction. This makes possible a continuous process procedure having a high throughput. Using the process of the invention, reactors of smaller size can be implemented which are simply constructed and easy to maintain.

Advantageously, the first direction is directed toward an overflow port and the second direction is directed toward a feed port. At the feed port, expediently, a motive jet maintaining the flow in the reactor is generated. The provision of agitators is not necessary in a reactor operating according to the process of the invention. Accordingly, the sealing problems of the prior art that occur when agitators are used can be avoided.

The shell surface of the reactor, which can be constructed as a loop reactor, is advantageously heated. For this purpose a hot medium, in particular oil, can flow around it.

The flow conditions in the reactor can be controlled by a controlling device connected in an axial bypass, in addition to the impulse input of the motive jet. The controlling device can expediently be a pump.

According to the apparatus-side solution of the invention, the temperature-pressure hydrolysis takes place in a cylindrical reactor in which the residue to be treated flows axially in a first direction in a radially inner cylinder section and flows axially in a second direction in a radially outer section. The apparatus of the invention is simply constructed and easy to maintain. It permits a high throughput.

An illustrative example of an apparatus suitable for carrying out the process of the invention is described in more detail below with reference to the single drawing.

DETAILED DESCRIPTION OF THE INVENTION

Figure 1:
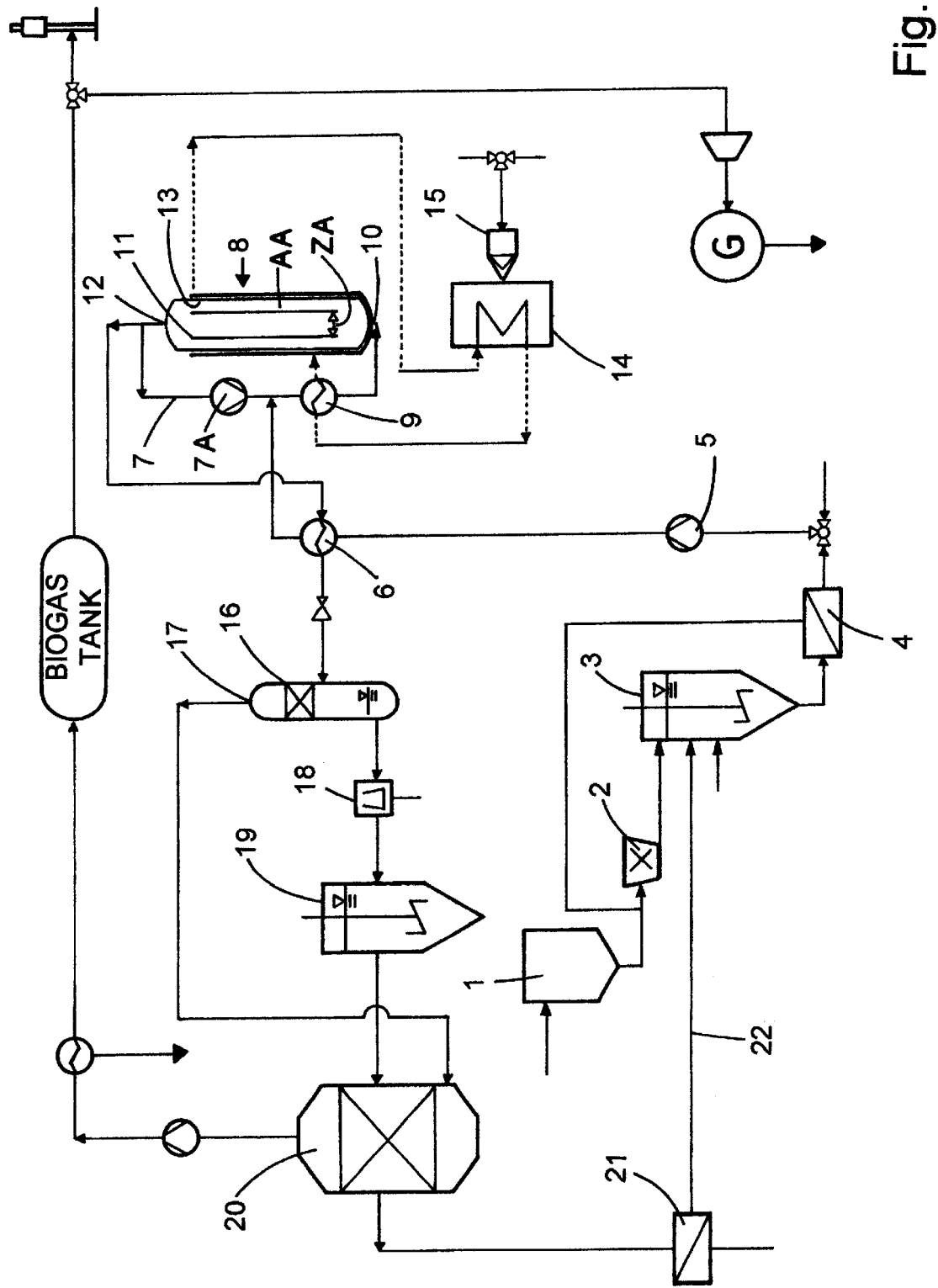
FIG. 1 of the drawing shows a diagrammatic circuit chart.

According to the present invention, biogenic residue is collected in a biowaste vessel 1. It is fed from the biowaste vessel to a macerator or shredder 2. In the shredder 2 the residue is comminuted to particle sizes from 10 to 20 mm. The comminuted residue then passes into a mashing vessel 3 where it is stirred with liquid, for example in a ratio of 1:10, to produce a suspension. A coarse filter 4 downstream of the mashing vessel 3 serves to separate off unwanted large particles that are recirculated to the shredder 2.

The suspension is then passed by means of a high-pressure pump 5 via a first heat exchanger 6 to a bypass 7. Hot suspension which has left a reactor 8 flows through the first heat exchanger 6. The preheated suspension flows through a second heat exchanger 9, which is connected in the bypass 7, and through which hot thermal oil flows. From there are heated suspension passes via a nozzle (not shown here) provided in a feed port 10 with simultaneous formation of a motive jet into the reactor 8. This is a loop reactor. In the interior of the cylindrically constructed reactor 8 coaxially disposed is a tube 11. The tube 11 defines a radially inner cylinder section ZA. In the cylinder section ZA the suspension flows axially in the direction of an overflow port 12. A baffle plate (not shown here) extending perpendicularly to the axial direction of flow can be mounted upstream of the overflow port 12. In the region of the reactor head, the flow is diverted outward by 180°. The suspension then flows axially in the direction of the feed port 10 in a radially outer section AA, that is to say between the tube 11 and a shell surface 13 of the reactor 8. In the vicinity of the feed port 10 the flow is diverted inward by 180° and the suspension is again fed to the radially inner cylinder section ZA. The amount of suspension which is fed to the reactor 8 via the feed port 10 continuously escapes via the overflow port 12. The flow conditions in the reactor 8, in particular the rate of coaxial circulation of the suspension, can be influenced by a pump 7A connected in the bypass 7.

The shell of the reactor 8 is substantially of double-walled construction. In the intermediate space formed by the double wall, hot thermal oil flows to heat the shell surface 13. The thermal oil is heated in a thermal oil heater 14 by a burner 15 or electrically and is circulated via the second heat exchanger 9 and the shell surface 13.

The temperature-pressure hydrolysis is carried out in the reactor 8 at a maximum temperature of 250° C. The pressure in this case is so far above the vapor pressure of the suspension that the liquid phase is maintained.

The suspension leaving the reactor 8 via the overflow port 12 passes via the first heat exchanger 6 into a stripping column 16. There the pressure is reduced to about 1.5 bar. Hydrolysis gas is taken off by means of a device 17 for taking off hydrolysis gas. The solids remaining in the suspension can be separated off in an optionally provided decanter 18. The suspension or the liquid is then fed to a receiving vessel 19 and from there to a fermenter 20. In the fermenter 20, the organic residue substances are further degraded under the action of anaerobic microorganisms with formation of biogas. The resultant turbid water can be fed via a connection line 22 to the mashing vessel 3 to produce new suspension or can be taken off from the process as end product. If it is taken off from the process there is the possibility of further reducing the solids content in the turbid water using a static thickener 21.

While the present invention has been described in terms of a preferred embodiment, it is apparent that other forms could be adopted by one skilled in the art. Accordingly, the scope of the present invention is to be limited only by the following claims.

List of designations

1. Biowaste vessel
2. Shredder
3. Mashing vessel
4. Coarse filter
5. High-pressure pump
6. First heat exchanger
7. Bypass
7A. Pump
8. Reactor
9. Second heat exchanger
10. Feed port
11. Tube
12. Overflow port
13. Shell surface
14. Thermal oil heater
15. Burner
16. Stripping column
17. Device for taking off hydrolysis gas
18. Decanter
19. Receiving vessel
20. Fermenter
21. Static thickener
22. Connection line
ZA. Radially inner cylinder section
AA. Radially outer section

What is claimed is:

1. Process for treating biogenic residue subjected to a temperature-pressure hydrolysis in a cylindrical reactor, said process comprising the steps of:
   flowing said biogenic residue axially in a first direction in a radially inner cylinder section of said cylindrical reactor; and
   flowing said biogenic residue axially in a second direction in a radially outer section of said cylindrical reactor, said second direction being in the opposite direction to said first direction.

2. Process according to claim 1, further comprising the step of providing an overflow port and a feed port in said cylindrical reactor, and wherein said first direction is directed toward said overflow port and said second direction is directed toward said feed port.

3. Process according to claim 2, further comprising the step of generating a motive jet to maintain the flow in said cylindrical reactor at said feed port.

4. Process according to claim 1, further comprising the step of using said cylindrical reactor as a loop reactor.

5. Process according to claim 1, further comprising the step of heating a shell surface of said cylindrical reactor.

6. Process according to claim 5, further comprising the step of heating said shell surface by a hot medium flowing around said shell surface.

7. Process according to claim 1, further comprising the step of influencing the flow conditions in said cylindrical reactor by a means for controlling connected in an axial bypass.

8. Process according to claim 7, further comprising the step of providing a pump as said means for controlling.

9. Process according to claim 1, further comprising the step of comminuting said residue to particle sizes of 10–50 mm prior to said temperature-pressure hydrolysis.

10. Process according to claim 1, further comprising the step of providing said residue suspended in liquid as a suspension.

11. Process according to claim 10, further comprising the step of limiting said suspension to a maximum of 15% dry matter.

12. Process according to claim 11, further comprising the step of heating said suspension prior to entry into said cylindrical reactor.

13. Process according to claim 12, further comprising the step of separating off fat phases from said suspension prior to entry into said cylindrical reactor.

14. Process according to claim 1, further comprising the step of reducing the pressure downstream of said temperature-pressure hydrolysis in a stripping column.

15. Process according to claim 14, further comprising the step of taking off hydrolysis gas in said stripping column.

16. Process according to claim 15, further comprising the step of reacting suspension taken off from said stripping column with the formation of biogas under the action of anaerobic microorganisms.

17. Process according to claim 16, further comprising the step of using biogas formed in the reaction as an energy carrier for heating said suspension and/or for heating said cylindrical reactor.

18. Process according to claim 16, further comprising the step of using water formed in the reaction for producing said suspension.

* * * * *